United States Patent
Lange et al.

(10) Patent No.: US 7,129,602 B2
(45) Date of Patent: Oct. 31, 2006

(54) METHOD FOR COOLING A TRANSVERSE FLOW SYNCHRONOUS MACHINE AND TRANSVERSE FLOW SYNCHRONOUS MACHINE

(75) Inventors: Andreas Lange, Zang (DE); Wolfram Angerer, Heidenheim (DE); Uwe Mühlberger, Heidenheim (DE)

(73) Assignee: Voith Turbo GmbH & Co. KG, Heidenheim (DE)

( * ) Notice: Subject to any disclaimer, the term of this patent is extended or adjusted under 35 U.S.C. 154(b) by 0 days.

(21) Appl. No.: 10/489,237

(22) PCT Filed: Sep. 11, 2002

(86) PCT No.: PCT/EP02/10191

§ 371 (c)(1),
(2), (4) Date: Jan. 18, 2005

(87) PCT Pub. No.: WO03/026102

PCT Pub. Date: Mar. 27, 2003

(65) Prior Publication Data

US 2006/0082248 A1    Apr. 20, 2006

(30) Foreign Application Priority Data

Sep. 14, 2001   (DE) .............................. 101 45 447

(51) Int. Cl.
- *H02K 9/19* (2006.01)
- *H02K 21/12* (2006.01)
- *H02K 1/06* (2006.01)
- *H02K 21/00* (2006.01)

(52) U.S. Cl. .................. 310/54; 310/52; 310/266; 310/162

(58) Field of Classification Search ................. 310/261, 310/266
See application file for complete search history.

(56) References Cited

U.S. PATENT DOCUMENTS

| 5,051,641 | A | * | 9/1991 | Weh | 310/163 |
| 5,543,674 | A | * | 8/1996 | Koehler | 310/164 |
| 5,773,910 | A | * | 6/1998 | Lange | 310/266 |
| 6,365,999 | B1 | * | 4/2002 | Muhlberger et al. | 310/254 |
| 6,952,068 | B1 | * | 10/2005 | Gieras et al. | 310/254 |
| 2002/0113520 | A1 | * | 8/2002 | Kastinger et al. | 310/261 |

FOREIGN PATENT DOCUMENTS

| DE | 4330272 | * | 12/1994 |
| DE | 43 35 848 | | 4/1995 |
| DE | 195 35 256 | * | 9/1995 |
| DE | 19753261 | | 6/1998 |
| DE | 198 24 202 | | 9/1999 |
| DE | 198 33 021 | * | 1/2000 |
| EP | 97/06733 | * | 12/1997 |
| EP | 0848478 | | 6/1998 |
| EP | 998010 | * | 10/1999 |

OTHER PUBLICATIONS

Internation Research Report dated Aug. 1, 2003 from corresponding PCT 02/10191.

* cited by examiner

*Primary Examiner*—Burton Mullins
(74) *Attorney, Agent, or Firm*—Ohlandt, Greeley, Ruggiero & Perle, L.L.P.

(57) ABSTRACT

A method and apparatus for cooling a transverse flow synchronous machine is provided which uses a coolant that is entrained by the rotor rotation during operation of the synchronous machine and is sprayed into the intermediate spaces between the plurality of stepped elements along the surface of the outer stator thereby forming a coolant-air mixture.

19 Claims, 2 Drawing Sheets

METHOD FOR COOLING A TRANSVERSE FLOW SYNCHRONOUS MACHINE AND TRANSVERSE FLOW SYNCHRONOUS MACHINE

RELATED APPLICATIONS

This application claims priority in PCT International Application No. PCT/EP02/10191, filed Sep. 11, 2002, and German Application No. DE 101 45 447.3 filed on Sep. 14, 2001, the disclosures of which are incorporated herein by reference.

BACKGROUND OF THE INVENTION

1. Field of the Invention

The invention concerns a method for cooling a transverse flow synchronous machine, in particular a transverse flow machine; in addition, a transverse flow synchronous machine.

2. Description of the Related Art

Synchronous machines with transverse flow are disclosed, for example, in the following publications:

(1) DE 3,536,538 A1
(2) DE 3,705,089 C1
(3) DE 3,904,516 C1
(4) DE 4,125,779 C1

These essentially describe the basic principle and the construction.

These machines comprise at least one stator with at least one armature winding and a rotor lying opposite the armature winding. The rotor is comprised of at least two annular elements arranged next to one another, separated by an intermediate layer of magnetically and electrically nonconductive material, and in the circumferential direction these elements have a plurality of alternatively arranged polarized magnets and soft-iron elements. Such an arrangement of two annular elements forms a pole structure. Transverse flow machines are preferably constructed symmetrically. These then comprise two pole structures separated by a central support disk.

In such a machine, heat is generated during operation both in the rotor as well as in the stator due to the power dissipation occurring through the windings and the magnetic core and caused by induced eddy currents. If suitable measures are not taken, this limits the loadability and thus also the availability or operating time of the A.C. machine. Situations are particularly critical, in which such a machine operates under high load and particularly at high rpm.

In order to avoid this disadvantageous effect, it is basically known to connect the stator to cooling devices. In this way, the heating of the machine and its components can be reduced.

A plurality of possibilities for improving the cooling effect are known from DE 4,335,848 A1 for designing a cooling arrangement in detail in such a way that it has at least one cooling channel, which is incorporated in the stator in the region or in the vicinity of the support disk and a cooling fluid is passed through it. Each cooling channel is separated from the support disk only by a channel cover of minimal thickness and the air gap between rotor and stator. A design with at least [one] axially running cooling channel in a spacer disk, which is provided between a pair of stator segments, is also known from this publication. The spacer disk lies radially opposite the support disk, is arranged symmetrically relative to the support disk and is thermally insulated opposite the stator segments. It is comprised of a material which is magnetically passive and has good heat conductivity.

SUMMARY OF THE INVENTION

Another known possibility for reducing heat consists of the fact of providing the support disk and the regions of the stator lying opposite it in the region of the cooling channels with complementary teeth which mutually engage and which have surfaces running substantially parallel to one another and are separated from one another by an air gap.

It is also known to provide measures on the rotor, either instead of or in addition to the above-described measures for stator cooling and thus indirectly for rotor cooling. The rotor has at least one pair of collector rings, which are joined by an insulating ring made of magnetically passive and electrically nonconductive material, whereby memory cells, which are filled with a phase transfer material, are incorporated in the insulation ring, and are distributed in the circumferential direction.

The effect of these known measures can be increased by suitable selection of materials and a surface treatment.

The disadvantage of the known designs consists of the fact that large cooling effects can be obtained only with high technical expenditure for manufacture. The most intensely stressed and heated regions of the rotor often cannot be optimally cooled and, in particular, cannot be cooled uniformly. Based on the construction of the transverse flow machine, the cooling of several regions of the rotor is possible only indirectly, in particular, the connection sites between the individual annular elements of a pole structure and/or the connection between support disks and pole structures. These are the regions, however, which are most intensely subjected to heating.

Known from publication WO 98/25331 is a method for the cooling of an A.C. machine with a rotor and a stator, which form at least one radial inner and/or radial outer intermediate space between them, in particular for transverse flow synchronous machines, in which the regions of the rotor that cannot be cooled directly are cooled by means of a coolant-air mixture that forms due to spraying. For this purpose, the A.C. machine, in particular, the transverse flow machine, is partially filled so that a coolant pool is formed at least in the installed position below the rotor axis in the mathematical sense, when the machine is not operated, such that during operation of the A.C. machine, the coolant is partially entrained and sprayed by the rotor rotation, and the sprayed particles can reach into at least one of the intermediate spaces and thus into the region of the rotor. Thus, filling is produced in such a way that a coolant pool is formed under the rotor axis in the radial outer intermediate space between rotor and stator denoted as the air gap, considered in the installed position. During operation of the A.C. machine, a coolant-air mixture is substantially formed, as a function of the rpm of the rotor shaft and of the filling state, in the air gap between rotor and stator. By heat flow and heat transfer, this takes over the heat transport from the rotor to the water-cooled stator, for example. The coolant-air mixture essentially takes over only the heat transport, for which reason, no additional devices need be provided for cooling the coolant, and a one-time partial filling with coolant, which remains inside the A.C. machine, is usually sufficient. It has now been shown, however, that in transverse flow machines corresponding to the design of this method described in publications 1 to 4, the desired effect is not achieved, i.e., the rotor nevertheless does not undergo the desired cooling.

The object of the invention is thus to design a cooling arrangement of a transverse flow synchronous machine in such a way that, in addition to the assurance of an effective cooling of the transverse flow synchronous machine, in particular, of the rotor as a particularly intensely stressed component, a smaller expenditure is required for construction.

The solution according to the invention is characterized by the features of claims 1 and 7. Advantageous configurations are described in the subclaims.

The solution according to the invention for an optimal rotor cooling of transverse flow synchronous machines is characterized by application of a method for cooling, in which a coolant found in the coolant pool is sprayed into a coolant-air mixture on the basis of the rotor rotation, for a special stator construction and a rotor design. The stator construction is characterized in that only the inner stator bears an armature winding, while the outer stator is designed of a plurality of individual stator elements, which are designed as solid profile components, preferably made of materials that are produced by powder metallurgy and compacted. These are substantially formed as strip-type individual elements which form or bear tooth elements directed toward the rotor and which can be fastened with simple fastening elements directly to the stator housing in a detachable or non-detachable manner. The plurality of individual stator elements at the outer stator, which are arranged at a certain distance relative to one another in the circumferential direction and which thus always form intermediate spaces, makes possible a considerable enlargement of the surface due to the fissured structure, and thus an essential increase in the [number of] contact sites for the coolant-air mixture for uptake of the heat dissipated from the rotor by this means. In contrast, in conventional designs of transverse flow synchronous machines, the individual stator units, in particular the outer stator, are comprised of a plurality of soft-iron units arranged one behind the other, which are embedded in the stator housing and thus provide a substantially smooth stator structure. The rotor structure is characterized by an outer surface that is not smooth. The rotor has a stepped structure, which is produced by variable radial dimensions of the magnet arrangements and soft-iron elements arranged alternately in the circumferential direction. This rotor structure considerably favors the effect of the spraying of the coolant. According to the invention, for this purpose, the transverse flow synchronous machine is partially filled with a coolant, in such a way that a coolant pool is formed in the installed position in the mathematical sense underneath the rotor axis, in particular in the region of the outer air gap between rotor and outer stator when the synchronous machine is not in operation, and this pool is entrained first on the basis of the stepped structure of the rotor immersed in the coolant pool when the synchronous machine is not in operation, and then based on the underpressure that arises during the rotor rotation, is swirled around and sprayed at the individual stator elements, and the sprayed particles from the intermediate spaces gain access to the region of the rotor. The rotor is thus immersed directly in the coolant pool only when the synchronous machine is not in operation and during a short time after startup of operation. The coolant is entrained based on the pressure conditions conditioned by the structure of the rotor. The rotor is thus not cooled directly by the coolant, but by the coolant-air mixture which is formed by swirling and atomizing. Thus, the coolant is sprayed into many individual droplets, and, in fact, under normal pressure and normal temperature conditions in the synchronous machine. The mist of droplets is distributed over the entire inner space of the machine. The rotor is cooled by heat transport at the stator elements. No additional sealing is necessary. This process is conducted free of hydraulic friction. Based on the intermediate spaces conditioned by the stator construction, the stator surface made available, in particular at the outer stator, is considerably enlarged, which, first of all, brings about a positive effect for the spraying and, in addition, also considerably enlarges the surface made available for the heat discharge relative to possible cooling. Since the coolant-air mixture essentially only takes over the heat transport, it is not necessary to provide additional devices for cooling the coolant. A one-time partial filling with coolant, which remains inside the A.C. machine, is sufficient.

The intermediate spaces between the rotor and the stator are defined with respect to their radial position, proceeding from theoretical symmetry or the axis which corresponds to the axis of rotation of the rotor.

Preferably, an oil of low viscosity, for example, is used as the coolant with low viscosity, i.e., with a small internal friction as a consequence of dynamic effects between the molecules.

The solution according to the invention offers the possibility of the dissipation of heat also at critical regions of the rotor, which previously could be cooled only insufficiently by means of conventional cooling arrangements.

The heat of the stator can be dissipated by means of conventional simple stator cooling devices, for example, cooling channels in the stator housing.

The solution according to the invention can also be used as a measure for additional cooling in combination with conventional cooling measures. In machines of low power, however, partial filling in combination with simple stator cooling is sufficient.

The selection of suitable combinations of the oil mist cooling according to the invention with conventional cooling arrangements for stator cooling lies in the province of the person skilled in the art and is oriented to the specific case of application. The stator can be cooled in a different way, directly or indirectly, by means of different cooling media. In the simplest case, it is connected to appropriate cooling devices, or coolant channels that can be filled with coolant are provided in the basic unit of the stator.

In addition, there is also the possibility of combining the cooling of the rotor according to the invention with already known measures for the indirect cooling of the rotor, in particular, for the local cooling of rotor segments.

Several examples are named in the following:

- For example, it is conceivable to provide at lease one cooling channel in the stator in the vicinity of the support disk, through which flows a cooling fluid, whereby the cooling channel is separated from the support disk only by a channel covering of minimal thickness and the intermediate space between rotor and stator.
- In a special embodiment, the cooling channel can run axially and be incorporated in a spacer disk, which is arranged between a pair of stator segments. The spacer disk is symmetrically arranged lying opposite the support disk in the radial direction and thermally insulated opposite the stator segments. The spacer disk is preferably comprised of a material which is magnetically passive and has a good heat conductivity. It has essentially radially running broad-surface hollow spaces on both sides of the cooling channel, and these spaces form a thermal insulation opposite the adjacent regions of the stator. The hollow spaces can be filled with air or other insulation materials.

In addition, the cooling channel can be arranged in the basic unit of the stator.

Relative to other possible measures, reference is made to DE 4,335,848 A1, whose disclosure content will be incorporated to the full extent in this application for possible combinations of the solution according to the invention with known cooling arrangements.

For the device, it is only necessary each time to assign means, particularly a coolant filling device, for providing the partial filling of the transverse flow synchronous machine.

The simplest way for providing the partial filling consists of forming the coolant pool in such a way that in the radial direction in the region of a line perpendicular to the axis of rotation underneath the rotor, the stator is completely immersed over a part of its extent in the circumferential direction, and thus also the radial outer intermediate space between stator and rotor is partially filled such that the rotor is immersed at least partially in the coolant pool in the vertical direction when the synchronous machine is not in operation. The coolant filling is preferably produced as a constant filling prior to the first startup of operation of the synchronous machine and later for replacement after emptying the old coolant at specific, preferably predefined or freely selectable time intervals. For the filling, it is only necessary that a) on the front side of the housing of the synchronous machine and/or b) in the element supporting the outer stator in the region of its front side or at the periphery passage openings and/or channels that can be closed are provided, which join together a space outside the radial outer intermediate space between rotor and outer stator and radial outer intermediate space, and to which a coolant source can be connected.

BRIEF DESCRIPTION OF THE DRAWINGS

The solution of the object according to the invention will be explained below on the basis of a figure. Thus.

DESCRIPTION OF THE INVENTION

Figure 1A:
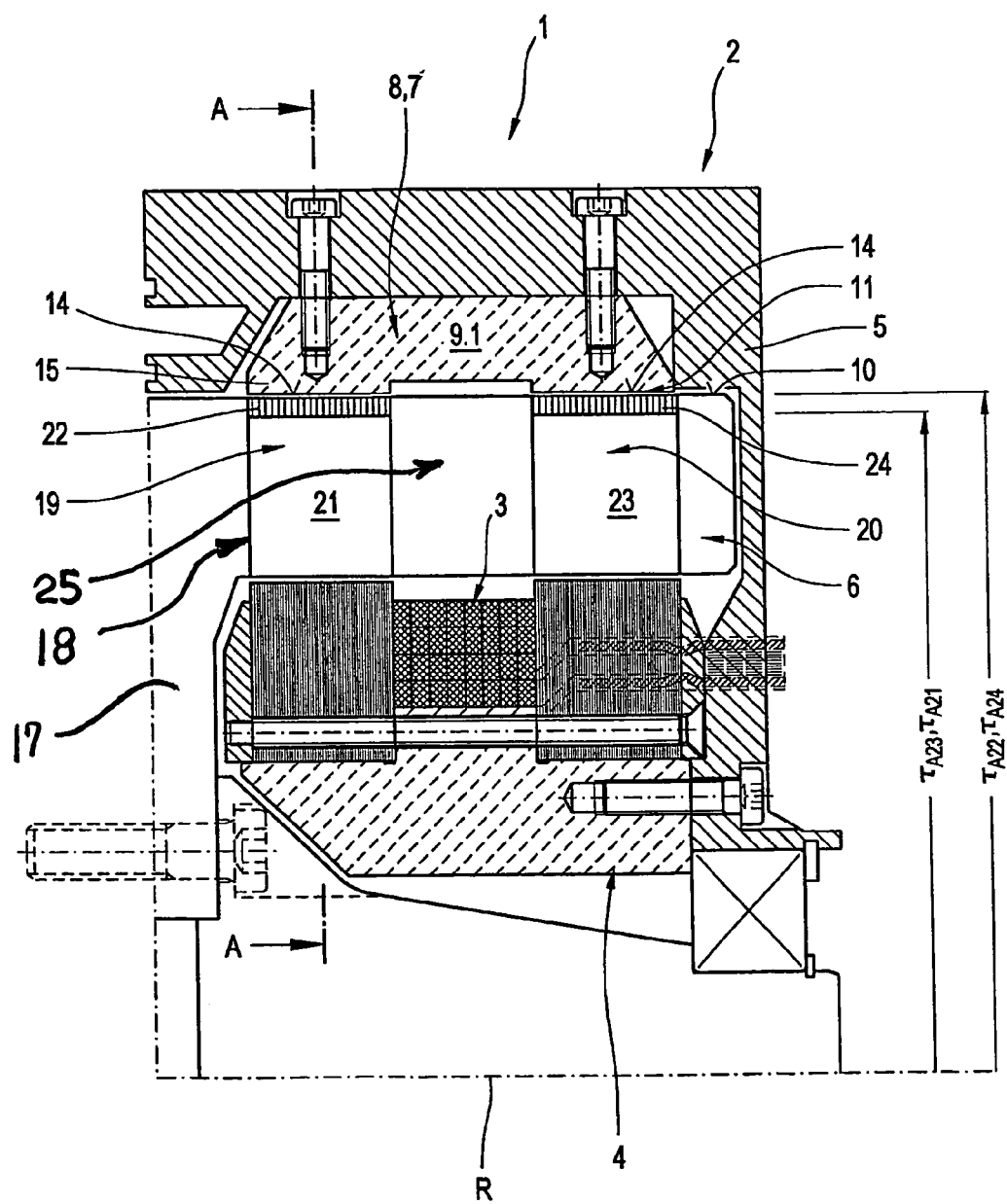
FIGS. 1a and 1b illustrate the basic principle of the method according to the invention, based on a sectional representation of a transverse flow machine in two views.

Based on an excerpt from an axial segment of a transverse flow synchronous machine 1, FIG. 1a illustrates the construction of a configured stator module 2 necessary to the solution according to the invention. The latter has at least one stator unit 4 bearing at least one armature winding 3. This is designed here as an element of the total module of the inner stator. Stator unit 4 is arranged in a stator housing 5. In addition, a rotor 6 of transverse flow synchronous machine 1 is mounted in a rotatable manner in housing 5. Stator module 2 comprises, in addition, a second stator unit 3, which functions as the outer stator 7. This comprises a plurality of individual stator elements 9.1 to 9.n, which are arranged one behind the other in the circumferential direction, and which also have, for example, an essentially U-shaped cross section in the axial segment according to FIG. 1a, but at least are designed as tooth elements or elements bearing teeth 15. The stator elements 9.1 to 9.n form with the outer surface 10 of rotor 6 in the installed position or mounted state of synchronous machine 1 an air gap 11, which is also denoted a radial outer intermediate space. Stator unit 8 is thus preferably free of an armature winding. The individual stator elements 9.1 to 9.n are arranged behind one another at a specific distance from one another in the circumferential direction. These thus form intermediate spaces 12.1 to 12.n. These intermediate spaces are connected with the radial outer intermediate space 11 between rotor 6 and outer stator 8. Rotor 6 comprises a central support disk 17 and at least one, preferably two pole structures extending away from the support disk 17 in the axial direction; here a pole structure 18 is shown, comprising two rows of magnet arrangements with alternating magnetization and arranged one behind the other in the circumferential direction, with soft-iron elements lying in between. The rows are designated 19 and 20 for the pole structure 18 which is shown. The magnet arrangements of row 19 are given the reference 21. The soft-iron units of row 19 are designated reference 22 in this view. The magnet arrangements of row 20 are designated reference 23 and the softiron elements are given the reference 24. Rows 19 and 20 are separated from one another by an intermediate layer, here intermediate layer 25 made of magnetically and electrically nonconductive material. The radial outer dimensions of the magnet arrangements 21 and 23 and the soft-iron elements 22 and 24 arranged in between are different and thus produce a structure of rotor 6 that is stepped in the circumferential direction and thus an uneven outer surface at the outer periphery 14 of the rotor. Represented are $\tau_{A21}$, $\tau_{A23}$ for the magnet arrangements of both rows 19 and 20 and $\tau_{A22}$ and $\tau_{A24}$ for the softiron elements 22 and 24 of rows 19 and 20.

Figure 1B:
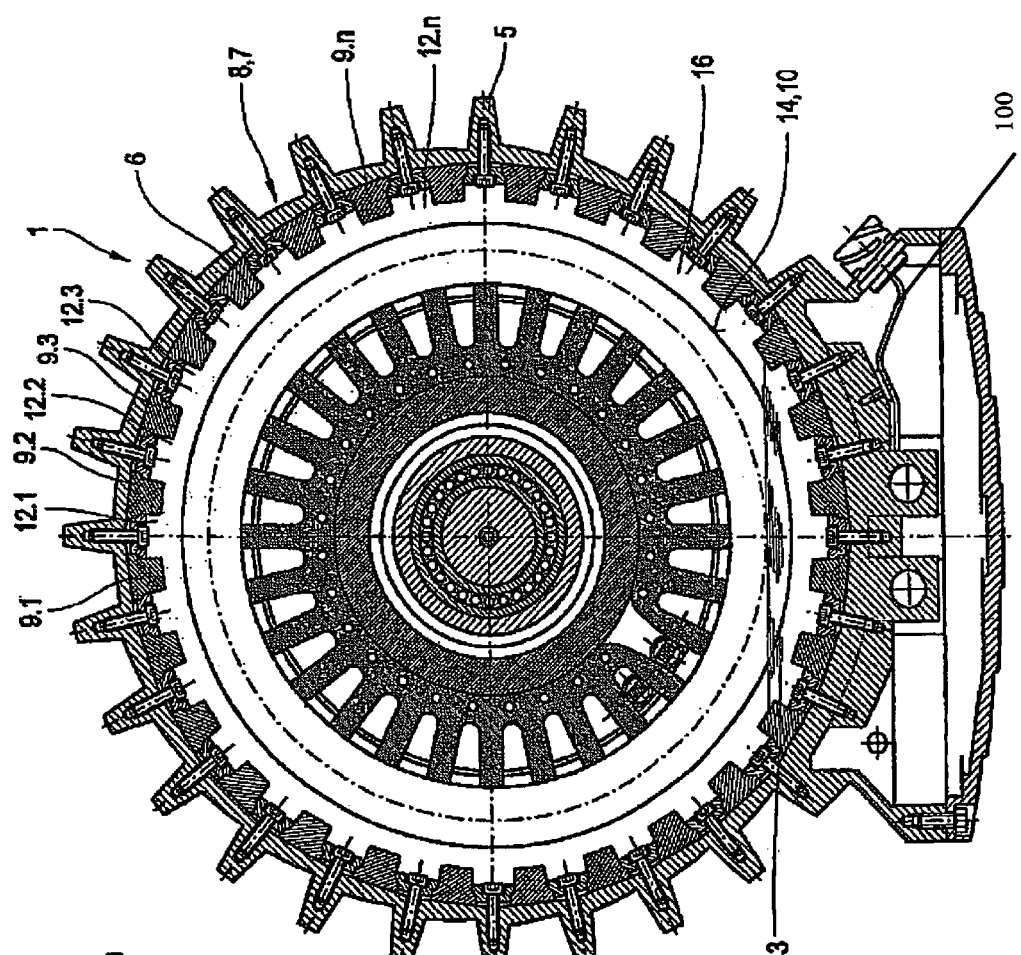

The embodiments shown in FIGS. 1a and 1b describe a particularly compact configuration of a stator module 2, in particular a stator unit in the form of an outer stator. This makes possible a large surface based on the front surfaces of the individual stator elements 9.1 to 9.n, which are aligned in the circumferential direction and which, due to the fastening, can be drawn on completely for cooling purposes and for the generation of the coolant-air mixture. The individual stator element 9.1 to 9.n is designed as an element with an expanded back side, which preferably is produced by powder metallurgy, i.e., compacted and thus is produced in one piece. The individual stator element is designed as a solid part and is preferably joined with the stator housing 5 only in a nonpositive or positive manner by means of joining elements. For this purpose, in the simplest case, the stator housing comprises an annular housing part. The fastening elements are thus guided through the housing wall of the annular housing part and brought to an active connection with corresponding counter-elements on the individual stator elements. In the simplest case, each individual stator element 9.1 to 9.n, for this purpose, has at least one thread worked into it. The thread thus extends from the outer surface [of the stator] directed away from the rotor and runs in the direction of rotor 6. Other simple to produce fastenings, for example, by clamping, are also possible.

Means for filling the inner space 16 with a coolant are assigned to transverse flow synchronous machine 1 and include channel 100 shown in FIG. 1b. The inner space 16 is filled at least above a part of the outer intermediate space 11 in the radial direction. The coolant level 13 which is adjusted when the synchronous machine is not in operation is thus at least touched upon by the outer periphery 14 of rotor 6, and preferably the latter is partially immersed in the coolant. When the synchronous machine is placed in operation, the coolant is entrained by the rotation and the stepped structure of rotor 6 and is sprayed due to the forces thereby acting on the coolant. There is essentially formed a coolant-air mixture in the intermediate space [between] rotor 6 and stator 2, as a function of the rpm of the rotor shaft and the filling state. By heat flow and heat transfer, this takes over the heat transport from rotor 6 to stator 8. Due to the intermediate spaces 12.1 to 12.n conditioned by the stator construction, the stator surface which is available, in particular at the outer stator, is considerably enlarged, which, first of all, favors the spraying and, in addition, considerably enlarges the surface which is made available for the heat dissipation, also relative to possible cooling. Since the coolantair mixture essentially only takes over the heat transport, it is not necessary to provide additional devices for cooling the coolant. A one-time partial filling with coolant, which remains inside the synchronous machine, is sufficient.

The outer stator 7 can be cooled, for example, via cooling channels (not shown) in housing 5. Other possibilities are conceivable.

The invention claimed is:

1. A transverse flow synchronous machine comprising:
   a rotor having an outer surface which is stepped;
   a stator module having at least one outer stator with a stator housing;
   at least one cooling device in fluid communication with the at least one outer stator and having a filling intake, wherein the rotor and the at least one outer stator form an inner space in the radial direction therebetween, wherein the filling intake provides for at least partially filling a portion of the inner space with a coolant, and wherein the at least one outer stator has a plurality of elements separated from one another and the at least one outer stator is free of an armature winding.

2. The transverse flow synchronous machine of claim 1, wherein the plurality of elements are formed in strips.

3. The transverse flow synchronous machine of claim 1, wherein the stepped outer surface of the rotor is produced by radial dimensions that change in an alternating manner in a circumferential direction.

4. The transverse flow synchronous machine of claim 1, further comprising at least one pole and a central support disk, the at least one pole being disposed in proximity to the central support disk and extending in an axial direction therefrom, the at least one pole having two rows of soft-iron elements substantially adjacent to each other in the circumferential direction and having an intermediate layer disposed therebetween, each of the softiron elements having alternately magnetized magnets disposed therebetween, wherein the stepped outer surface is produced by differing radial outer dimensions of the magnets and the soft-iron elements.

5. The transverse flow synchronous machine of claim 1, wherein the plurality of elements are made at least in part by powder metallurgy.

6. The transverse flow synchronous machine of claim 5, wherein the plurality of elements are joined to the stator housing by fastening elements.

7. The transverse flow synchronous machine of claim 6, wherein the fastening elements are screw connections.

8. The transverse flow synchronous machine of claim 1, wherein the plurality of elements form teeth.

9. The transverse flow synchronous machine of claim 8, wherein the teeth are displaced relative to one another in a circumferential direction.

10. The transverse flow synchronous machine of claim 8, wherein the teeth are in one plane in a circumferential direction.

11. The synchronous machine of claim 1, wherein the filling intake is a channel in fluid communication with the intermediate space and is selectively closeable.

12. The synchronous machine of claim 1, wherein the cooling device has at least one channel that can be filled with a cooling medium and is in fluid communication with the stator housing.

13. A method for cooling a transverse flow synchronous machine having a rotor, at least one outer stator and an inner space formed therebetween, the method comprising:
   at least partially filling the synchronous machine with a coolant thereby forming a coolant pool when the synchronous machine is not in operation, the coolant pool at least partially immersing the rotor, a level of the coolant pool being adjustable at least in a region of the inner space disposed under an axis of rotation of the rotor, the rotor having a stepped outer surface at an outer circumference thereof, the at least one outer stator having a plurality of elements extending therefrom and being separated from one another to form intermediate spaces therebetween, the at least one outer stator being free of an armature winding;
   entraining the coolant by rotation of the rotor during operation of the synchronous machine, the entraining being due at least in part to an underpressure that arises; and
   spraying the coolant during operation of the synchronous machine into at least one of the intermediate spaces between the plurality of elements thereby forming a coolant-air mixture, wherein at least a portion of the at least one outer stator is cooled.

14. The method of claim 13, wherein the coolant is oil.

15. The method of claim 13, wherein the coolant remains in the inner space in a closed system without circulation, and wherein the inner space is maintained free of a hermetic seal.

16. The method of claim 13, wherein the coolant remains for a predetermined period of time in the synchronous machine and is replaced after at least partially filling the synchronous machine.

17. The method of claim 13, further comprising providing additional cooling for at least a portion of the at least one outer stator.

18. The method of claim 17, further comprising introducing a cooling medium through a wall of a stator housing of the at least one outer stator.

19. The method of claim 17, further comprising guiding a cooling medium along an outer circumference of a stator housing of the at least one outer stator.

* * * * *